United States Patent [19]

Berry et al.

[11] Patent Number: 4,900,292

[45] Date of Patent: Feb. 13, 1990

[54] ROTOR ASSEMBLIES

[75] Inventors: Paul S. Berry, Bedford; Derek J. Frost, North Brickhill; Peter F. Inskip, Haynes, all of England

[73] Assignee: National Research Development Corporation, London, England

[21] Appl. No.: 190,141

[22] Filed: May 4, 1988

[30] Foreign Application Priority Data

May 5, 1987 [GB] United Kingdom ............... 8710610

[51] Int. Cl.$^4$ .................. F16H 7/00; A27C 21/02
[52] U.S. Cl. ..................... 474/84; 17/11.1 R
[58] Field of Search .................. 474/69–71, 474/84–89; 56/103, 104, 219; 17/11.1 R; 119/82

[56] References Cited

U.S. PATENT DOCUMENTS

| | | | |
|---|---|---|---|
| 2,235,619 | 3/1941 | McMahan et al. | 17/11.1 R |
| 3,235,904 | 2/1966 | Brown et al. | 17/11.1 R |
| 4,282,632 | 8/1981 | Conaway | 17/11.1 R |
| 4,508,062 | 4/1985 | Berry et al. | 56/328 R X |
| 4,513,689 | 4/1985 | Berry et al. | 119/82 |

FOREIGN PATENT DOCUMENTS 2128870 5/1984 United Kingdom .
2138763 10/1984 United Kingdom .

Primary Examiner—Thuy M. Bui
Attorney, Agent, or Firm—Cushman, Darby & Cushman

[57] ABSTRACT

A rotor assembly for use in a poultry harvester, comprising first and second rotors arranged side by side about a center line of the assembly for rotation about vertical or predominantly vertical axes, a third rotor equispaced from the first and second rotors in a direction along the center line of the assembly, and drive means for rotating the third rotor in a clockwise or anticlockwise sense, as desired, during operation of the assembly, the drives for the first and second rotors being derived from the motion of the third rotor and being operative to counter-rotate the first and second rotors in rotational senses which remain unaltered irrespective of the direction of rotation of the third rotor at any given moment, each rotor providing a continuous array of radially-extending guide elements closely adjacent and/or abutting and/or intermeshing with the guide elements of the other rotors.

11 Claims, 6 Drawing Sheets

ROTOR ASSEMBLIES

The present invention relates to rotor assemblies and in particular, but not exclusively, to rotor assemblies for use in a poultry harvester e.g. for harvesting birds from the litter to a broiler or rearing house.

According to the present invention a rotor assembly for use in a poultry harvester, comprises first and second rotors arranged side by side about a centre line of the assembly for rotation about vertical or predominantly vertical axes, a third rotor equispaced from the first and second rotors in a direction along the centre line of the assembly, and drive mens for rotating the third rotor in a clockwise or anticlockwise sense, as desired, during operation of the assembly, the drives for the first and second rotors being derived from the motion of the third rotor and being operative to counter-rotate the first and second rotors in rotational senses which remain unaltered irrespective of the direction of rotation of the third rotor at any given moment, each rotor providing a continuous array of radially-extending guide elements closely adjacent and/or abutting and/or intermeshing with the guide elements of the other rotors.

Conveniently, the drives to the first and second rotors each include a so-called sprag clutch or like one-way transmission means (e.g. of the type used on pedal bicycles) interposed between first and second elements of the drive, one of the one-way transmission means always being operative when the other is inoperative and vice versa, the first element of each said drive being driven from the third rotor drive at any given moment, and the rotor-connected second element of the drive being either driven, if the respective one-way transmission means is operative, in the same rotational sense as the associated first element or, if the respective transmission means is inoperative, being driven in the opposite sense from the second element of the other drive.

The invention also includes a poultry harvester including at its front end, a rotor assembly according to the present invention in which the third rotor leads the other two rotors and the mutually adjacent peripheral regions of the first and second rotors in operation move rearwardly away from the third rotor. Conveniently, in one such case, the rotation axis of the third rotor is substantially vertical while the rotation axes of the first and second rotors incline upwardly and forwardly.

The invention further includes a poultry harvester including at its rear end, a rotor assembly according to the present invention in which the third rotor trails the other two rotors and the mutually adjacent peripheral regions of the first and second rotors in operation move rearwardly towards the third rotor. Conveniently, in one such case, the rotation axes of all three rotors are substantially vertical.

Lastly, the invention additionally includes a poultry harvester having such rotor assemblies at both its ends, the rotor assembly with the leading third rotor being mounted at the front end of the harvester while that with the trailing third rotor is mounted at the rear end of the harvester.

Embodiments of the invention will now be described, by way of example only, with reference to the accompanying somewhat diagrammatic drawings in which.

Figure 1:
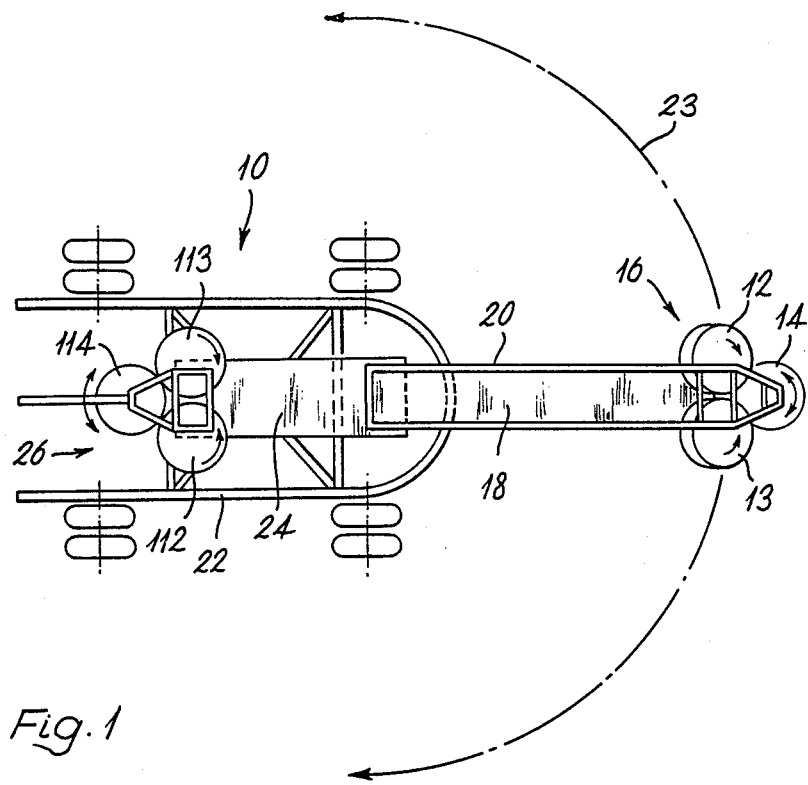
FIGS. 1 and 2 illustrate plan and side views of a poultry harvester using rotor assemblies according to the present invention.
Figure 5A:
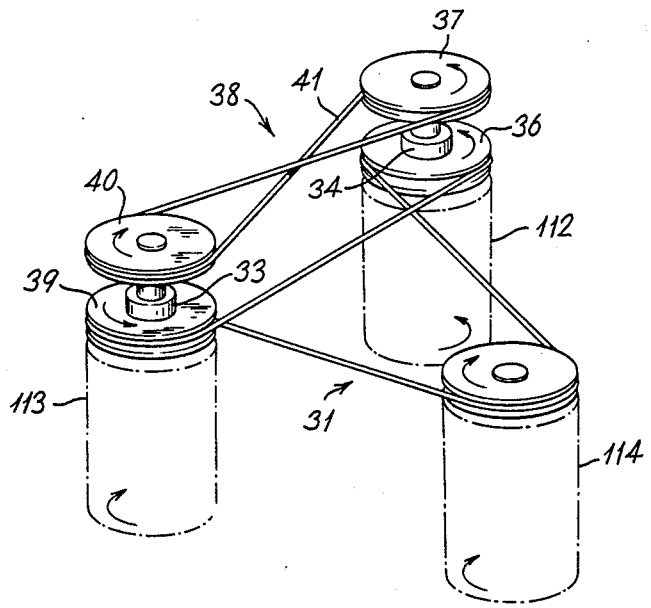
Figure 5B:
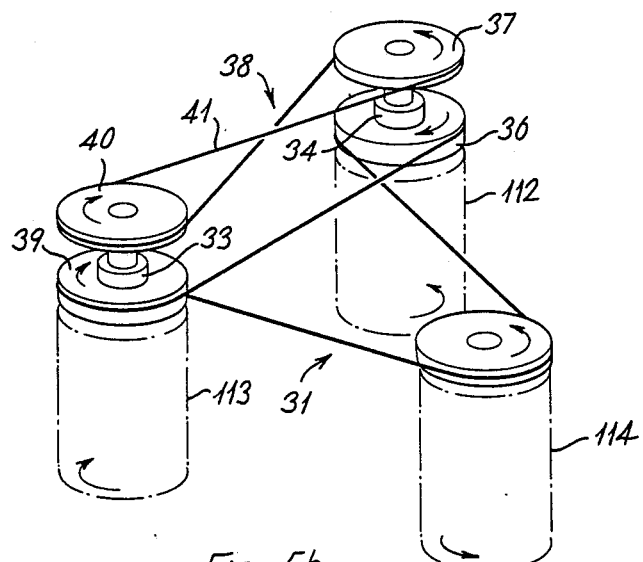
Figure 6A:
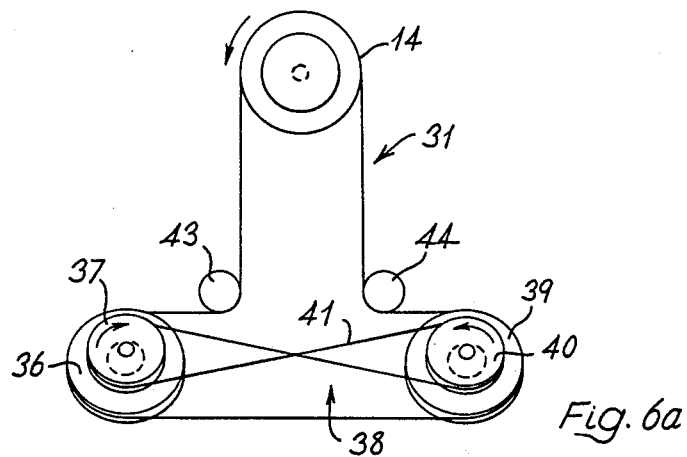
Figure 6B:
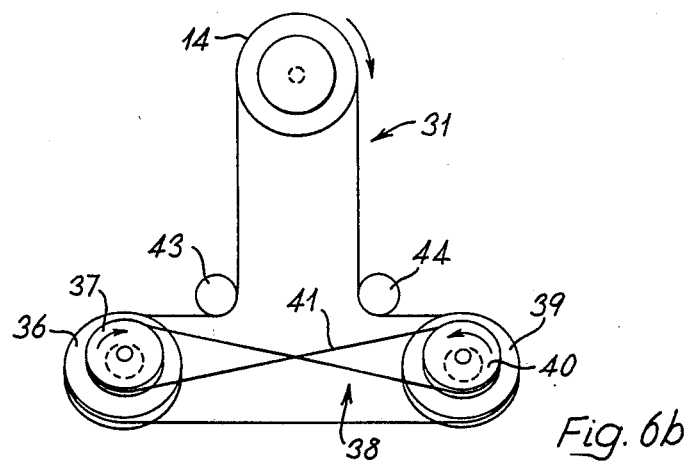
Figure 7:
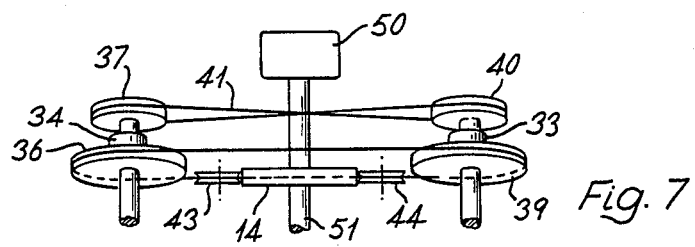
Figure 8A:
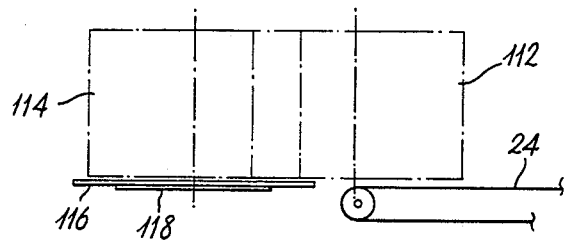
Figure 8B:
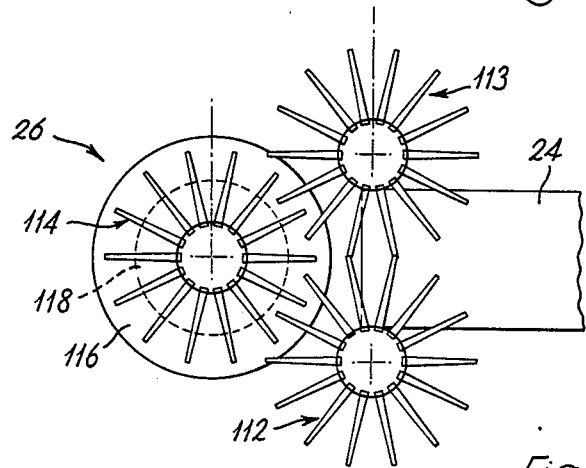
Figure 9:
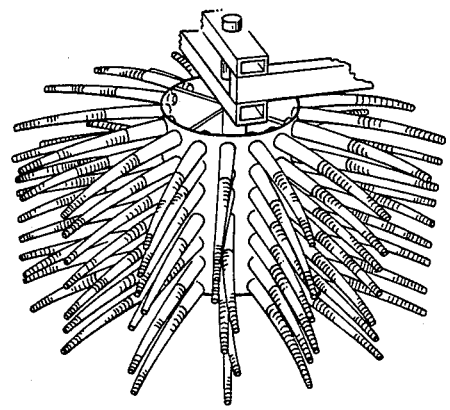
Figure 10:
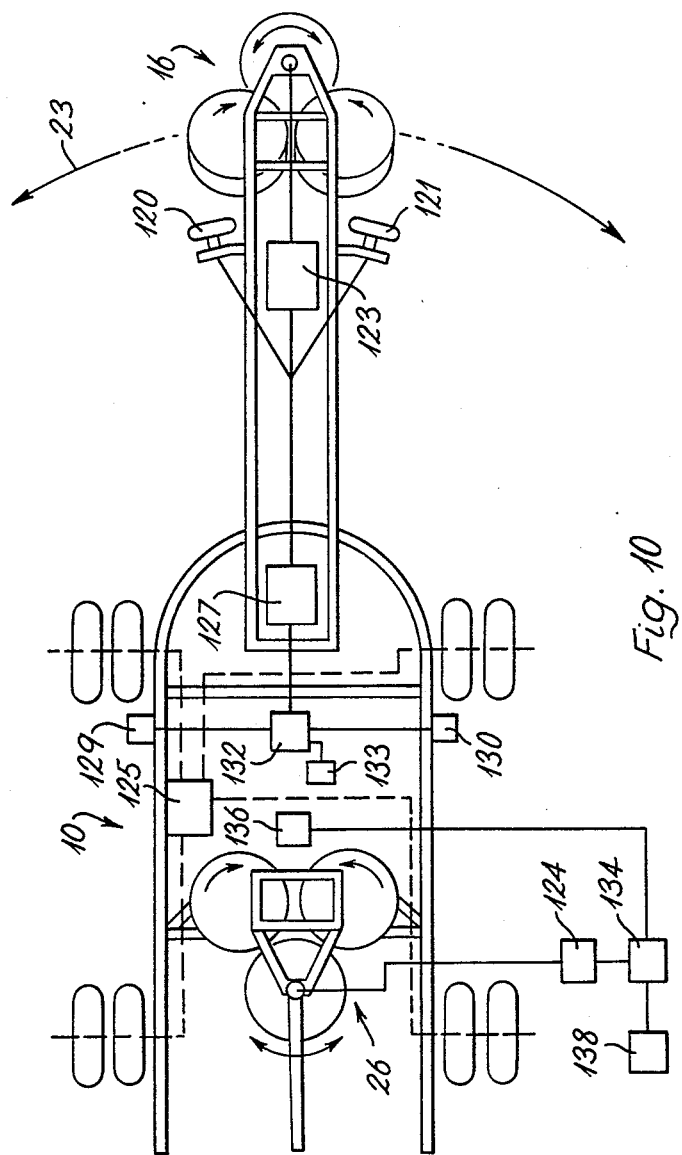

FIGS. 5(a) and 5(b) show perspective views of the rotor assembly used at the rear end of the harvester (in two different modes of operation) and/or, in modified form, at the front end of the harvester;

FIGS. 6(a) and 6(b) show plan views of an alternative rotor configuration for use at the front end of the harvester and/or, in modified form, at the rear end of the harvester;

FIG. 7 shows a side view of the rotor assembly of FIGS. 6(a) and 6(b);

FIGS. 8(a) and 8(b) show schematic side and plan views of a modified rotor assembly for use at the rear of the harvester;

FIG. 9 shows a detailed view of the preferred form of rotor used in the harvester pick-up head and discharge assembly; and FIG. 10 shows, in purely diagrammatic fashion, the various drives etc. not included in FIG. 1.

Figure 2:
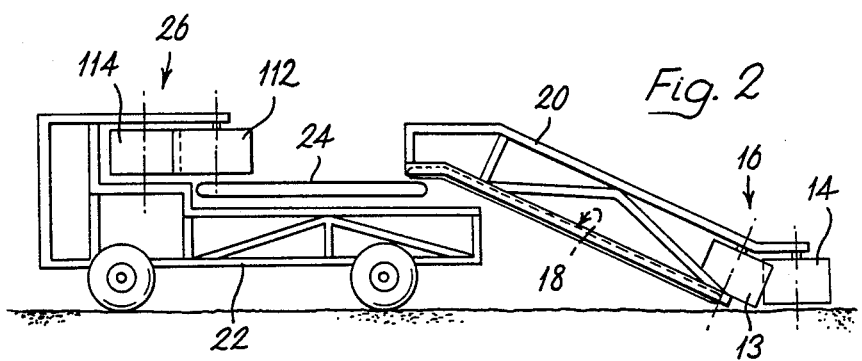

Referring first to FIGS. 1, 2 and 10, a mobile birdharvester 10 in accordance with the present invention comprises three rotors 12, 13, 14 mounted in a triangular formation to provide a pick-up head 16 at the front end of the harvester. Each of the rotors 12, 13, 14 provides an array of flexible rubber fingers of the sort currently used for plucking chicken carcasses.

One such rotor is shown in detail in FIG. 9 of the drawings from which it will be seen that each finger comprises a smooth root portion (adjacent a supporting drum member) and a corrugated end portion. Typically the fingers will taper from an initial diameter of about 25 mm to a final diameter of about 12 mm at the tip. The overall finger length is typically about 235 mm giving rise to an overlap of about 50 mm at the position of maximum intermesh between the two rotors. The resilient nature of the finger material allows the fingers to be pushed into appropriate apertures in the two drum members, a peripheral groove in the root portion of each finger ensuring that the finger locks securely into place in the drum aperture.

Further details of these rotors may be had from British Patent 2128870 which is based on the same priority application as U.S. Pat. No. 4,508,062.

Behind the pick-up head 16, is an angled upwardly moving conveyor belt 18 (omitted from FIG. 10). The support frame for belt 18 is provided by a scanning arm 20 the upper end of which is pivotally mounted on the harvester chassis 22 to allow the arm to scan over an arc 23 and the lower end of which is optionally carried on pivotting ground-support wheels 120, 121.

At its upper end, the conveyor 18 discharges on to a second conveyor 24 (omitted from FIG. 10) at the rear end of which is a 3-rotor discharge assembly 26. This latter is of the same or essentially the same configuration and rotor design as pick-up head 16 except that the end rotor (114) now trails the other two rotors (112, 113) and all three rotors rotate about vertical axes. This last requirement distinguishes the discharge assembly from the pick-up head 16 which only the end rotor 14 rotates about a vertical axis and the other two rotors 12, 13 rotate about upwardly and forwardly inclines axes lying perpendicular to the support surface of inclined belt 18.

Only the front and end rotors 14, 114 are powered directly from reversible motors 123, 124, the motion of the remaining rotors being derived from the two powered rotors as will be hereinafter described.

The harvester 10 can be driven either forward or backwards, the drives on the harvester being mechanical, electrical, hydraulic or pneumatic, or any combination of these, as convenient, with the prime mover 125 being carried on the chassis 22.

The scanning action of the arm 20 is effected by a reversible motor 127 either by rotationally driving the top end of the arm and/or, if preferred, by suitably driving its ground-support wheels 120, 121 (if present). At the end of its scan, the arm 20 will engage one or other of two contact switches 129, 130 which operate through a direction control unit 132 to reverse the drives from motors 123, 127. By having unit 132 also operative on motor 123, the directions of rotation of the front rotor 14 and the scanning arm 20 can be kept the same as one another throughout the harvesting operation.

As an alternative (or addition) to contact switches 129, 130, a manual (override) control 133 may be included for activating unit 132 to reverse the directions of scan and front rotor rotation.

The reversible motor 124 for powering discharge rotor 114 is also provided with a direction control unit 134 which determines the direction of rotation of the rotor at any given moment. Thus after a predetermined quantity of birds has passed along the conveyor 24 (as measured by a continuous weigher—136 located under the load-bearing top run of the conveyor), a signal from the weigher 136 operates unit 134 to reverse the rotational direction of the motor 124 and discharge rotor 114. This, in turn, switches the discharge of birds from one side of the machine to the other.

As an alternative, a manual control 138 may be used to activate direction control unit 134.

As indicated in FIG. 1, the rotor pairs 12, 13 and 112, 113 have fixed directions of rotation (respectively inwardly and outwardly of the associated belt 18, 24) and end rotors 14, 114 are able to change direction (as shown by the double-headed arrows) so as to rotate in a contrary rotational sense to a chosen rotor of the rotor pairs 12, 13 and 112, 113.

In operation, the broiler harvester 10 starts with the conveyors 18, 24 running and the various rotors rotating in the senses described.

The pick-up head then scans through the birds with the front rotor 14 automatically rotating in the same direction as the direction of scan as hereinbefore described to lift the birds up from the litter and place them onto the conveyor 18. The birds are then carried along by the conveyor 18 until they are discharged onto the second conveyor 24, along which they continue to travel until they are removed by the discharge assembly 26 for packing into crates or modules (not shown) at the sides of the assembly.

Conveniently, as above described, the direction control for rotor 114 is either manually operated or is automatically operated once a predetermined weight of birds has been discharged from the conveyor 24 (as detected by the continuous weigher 136 underneath the conveyor).

The ability to discharge the birds to one or other side of belt 24 at will, allows the loaded crates on one side of the belt to be replaced by empty crates while the discharge continues uninterrupted to the crates at the other side of belt 24.

When the scanning arm reaches the end of its travel the direction of rotation of the rotor front 14 is automatically reversed e.g. by an appropriate one of the contact switches 129, 130, and the harvester moves forward with the arm 20 scanning back in the reverse direction and the rotational sense of rotor 14 similarly reversed.

Conveniently, for example, in an electrical control system, the direction control units 132, 134 might comprise 3-way switches which can be activated (by the contact switches 129, 130, by the continuous weigher 136, or by the manual controls 133, 138, as the case may be) to reverse the polarity of their outputs to the reversible motors 123, 124 and 127.

Turning now to FIGS. 3 and 4 and FIGS. 5(a) and 5(b), for details of the inter-rotor drives, it will be noted that the end rotors 14, 114 may be driven in either direction from one or more reversible motors (not shown), mounted on the arm 20 e.g. the reversible motors 123, 124 of FIG. 10. The two associated rotors 12/13 and 112/113, on the other hand, are driven from rotor 14 and 114 by a belt and pulley drive 30, 31 through so-called sprag clutches present in both arrangements but only shown diagrammatically at 33, 34, in FIGS. 5(a) and 5(b). The sprag clutch, like the freewheel mechanism on a bicycle, is automatically operative when called upon to transmit motion in a first rotational sense but is inoperative i.e. it "slips", when called upon to transmit motion in the reverse directional sense. In the arrangement shown in FIGS. 5(a) and 5(b), the sprag clutch 34 is designed to transmit an anti-clockwise rotation of the belt-driven pulley 36 to upper pulley 37 of a second pulley belt system 38 and to freewheel for clockwise rotations of pulley 36. Sprag clutch 33, on the other hand, is designed to transmit a clockwise rotation of the driven pulley 39 to the upper pulley 40 of system 38 but to freewheel for anti-clockwise rotations of pulley 39.

Thus at any particular moment, the rotor then associated with a slipping sprag clutch 33, 34 will instead be driven from the cross-belt drive 41 of system 38. The result of this arrangement is that although pulleys 37, 40 are driven from the front rotor 14, 114, they will always rotate in the desired contrary directions to one another irrespective of the direction in which that front rotor is rotating.

When harvesting or discharging birds to the left-hand side, as shown in FIG. 2, it is the left-hand rotor of rotor pairs 12/13, 112/113 that will be rotating in the contrary rotational sense to the end rotor 14, 114 while the other rotor of that pair will be rotating in the same rotational sense as the end rotor.

In the situation shown in FIG. 5(b), for example, the end rotor 114 rotates anti-clockwise and the left-hand rotor 113 clockwise. In this case it is sprag clutch 33 that drives the left-hand rotor 113 and sprag clutch 34 that freewheels.

When discharging birds to the right-hand side as shown in FIG. 5(a), however, the sprag clutch 34 is operative and drives the right-hand side rotor 112 anti-clockwise, the left-hand rotor 113 being driven clockwise via the cross belt 41 with sprag clutch 33 inoperative so as to allow rotation of pulley 40 and rotor 113 in the contrary direction to pulley 37.

As already explained, a similar drive mechanism to that described above is used to collect birds from the floor at the pick-up head 16 and to transfer them onto the front conveyor 18.

Figure 3:
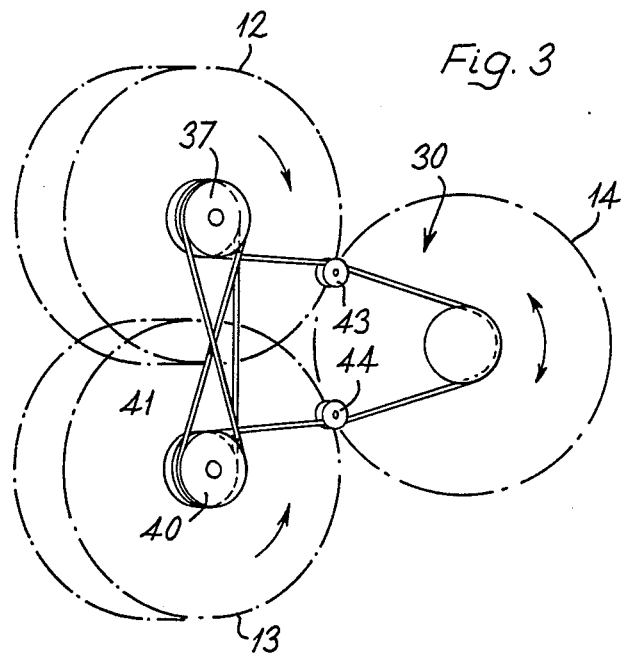
FIGS. 3 and 4 show on a larger scale plan and side views of the rotor assembly used at the front end of the harvester.
Figure 4:
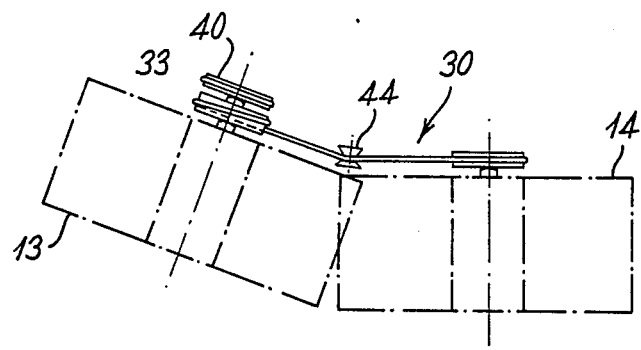

FIGS. 6(a), 6(b) and 7 show an alternative belt arrangement to that shown in FIGS. 3 and 4, although for simplicity, the same reference numerals have been used to indicate parts playing an analogous or closely related role to the similarly numbered parts of the systems shown in the earlier Figures. In addition, reference numeral 50 indicates a reversible motor for driving the front rotor shaft 51.

It will be appreciated that because of the now different path of the drive belt in the belt and pulley system 31, the operational senses of sprag clutches 33, 34 will be in the opposite directions to those of their counterparts in the system of FIGS. 3 and 4.

It will also be noted that although waisted support reels 43, 44 are required in the assemblies of FIGS. 3 and 4 and FIGS. 6(a), 6(b) and 7 due to the need to redirect the belt to suit the different inclinations of the rotor axes, these are only optional in the parallel axis assembly of FIGS. 5(a) and 5(b) where instead, as shown in these last two Figures, the drive pulley for rotor 114 can be slightly lower than pullies 36, 37 to prevent engagement of the crossing sections of the belt in drive system 31.

Although V-belts may be used throughout, it is preferred to use circular-section belts instead e.g. 10 mm diameter Routhane round-section belts.

FIGS. 8(a) and 8(b) show how the rearmost rotor 114 may be provided with a rubber conveyor disc 116 held in place by a rigid support disc 118 on the same axle as the rotor. In operation, the rubber disc 116 will rotate with the rotor 114 to assist in the conveying of the birds away from the discharge assembly 26.

We claim:

1. A rotor assembly for use in a poultry harvester, the assembly comprising first and second rotors U.S. Appln. 07/190,141—Berry et al arranged side by side about a center line of the assembly for rotation about a vertical or predominantly vertical axes, a third rotor equispaced from the first and second rotors in a direction along the center line of the assembly, and drive means for rotating the third rotor around a vertical axis in a clockwise or counterclockwise sense, as desired, during operation of the assembly, the drives for the first and second rotors being derived from the motion of the third rotor and being operative to counter-rotate the first and second rotors in rotational senses which remain unaltered irrespective of the direction of rotation of the third rotor at any given moment, each rotor providing a continuous array of radially-extending guide elements closely adjacent and/or abutting and/or intermeshing with the guide elements of the other rotors.

2. A poultry harvester including at its front end a rotor assembly as claimed in claim 1 in which the third rotor leads the other two rotors and the mutually adjacent peripheral regions of the first and second rotors in operation more rearwardly away from the third rotor.

3. A poultry harvester as claimed in claim 2 in which the rotation axis of the third rotor is substantially vertical while the rotation axes of the first and second rotors incline upwardly and forwardly.

4. A poultry harvester as claimed in claim 2 including at its rear end a rotor assembly in which the third rotor trails the other two rotors and the mutually adjacent peripheral regions of the first and second rotors in operation move rearwardly towards the third rotor.

5. A poultry harvester including at its rear end a rotor assembly comprising first and second rotors arranged side by side about a center line of the assembly for rotation about a vertical or predominantly vertical axes, a third rotor equispaced from the first and second rotors in a direction along the center line of the assembly, and drive means for rotating the third rotor in a clockwise or counterclockwise sense, during operation of the assembly, the drives for the first and second rotors being derived from the motion of the third rotor and being operative to counter-rotate the first and second rotors in rotational senses which remain unaltered irrespective of the direction of rotation of the third rotor at any given moment, each rotor providing a continuous array of radially-extending guide elements closely adjacent and/or abutting and/or intermeshing with the guide elements of the other rotors, and in said harvester, the third rotor trails the other two rotors and the mutually adjacent peripheral regions of the first and second rotors in operation move rearwardly towards the third rotor.

6. A poultry harvester as claimed in claim 5 in which the rotation axes of all three rotors are substantially vertical.

7. A rotor assembly for use in a poultry harvester, the assembly comprising first and second rotors arranged side by side about a center line of the assembly for rotation about a vertical or predominantly vertical axes, a third rotor equispaced from the first and second rotors in a direction along the center line of the assembly, and drive means for rotating the third rotor in a clockwise or counterclockwise sense, as desired, during operation of the assembly, the drives for the first and second rotors being derived from the motion of the third rotor and being operative to counter-rotate the first and second rotors in rotational senses which remain unaltered irrespective of the direction of rotation of the third rotor at any given moment, each rotor providing a continuous array of radially-extending guide elements closely adjacent and/or abutting and/or intermeshing with the guide elements of the other rotors, and further in which the drives to the first and second rotors each include at least one of a sprag clutch and like one-way transmission means interposed between first and second elements of the drive, one of the one-way transmission means always being operative when the other is inoperative and vice versa, the first element of each said drive being driven from the third rotor at any given moment, and the rotor-connected second element of the drive being either driven, if the respective one-way transmission is operative, in the same rotational sense as the associated first element or, if the respective one-way transmission is inoperative, being driven in the opposite sense from the second element of the drive.

8. A poultry harvester including at its rear end a rotor assembly as claimed in claim 7 in which the third rotor trails the other two rotors and the mutually adjacent peripheral regions of the first and second rotors in operation move rearwardly towards the third rotor.

9. A poultry harvester as claimed in claim 8 in which the rotation axes of all three rotors are substantially vertical.

10. A poultry harvester including at its front end a rotor assembly as claimed in claim 2 in which the third rotor leads the other two rotors and the mutually adjacent peripheral regions of the first and second rotors in operation move rearwardly away from the third rotor.

11. A poultry harvester a claimed in claim 10 including at its rear end a rotor assembly in which the third rotor trails the other two rotors and the mutually adjacent peripheral regions of the first and second rotors move rearwardly toward the third rotor.

* * * * *

UNITED STATES PATENT AND TRADEMARK OFFICE
CERTIFICATE OF CORRECTION

PATENT NO. : 4,900,292

DATED : February 13, 1990

INVENTOR(S) : BERRY, et al.

It is certified that error appears in the above-identified patent and that said Letters Patent is hereby corrected as shown below:

Col. 1, line 14, change "mens" to -- means --.

Col. 2, line 62, change "which" to -- where --;

line 64, change "inclines" to -- inclined --.

Col. 3, line 29, delete "-" between "weigher" and "136".

Col. 5, Claim 1, line 2, delete "U.S.";

line 3, delete "Appln. 07/190,141-Berry et al".

Signed and Sealed this

Fifteenth Day of October, 1991

*Attest:*

HARRY F. MANBECK, JR.

*Attesting Officer*     *Commissioner of Patents and Trademarks*